XR 2,708,261
X 1066C
May 10, 1955  R. R. THOMPSON  2,708,261
SUBSURFACE AREAL ELECTRICAL EXPLORATION
Filed Dec. 23, 1952
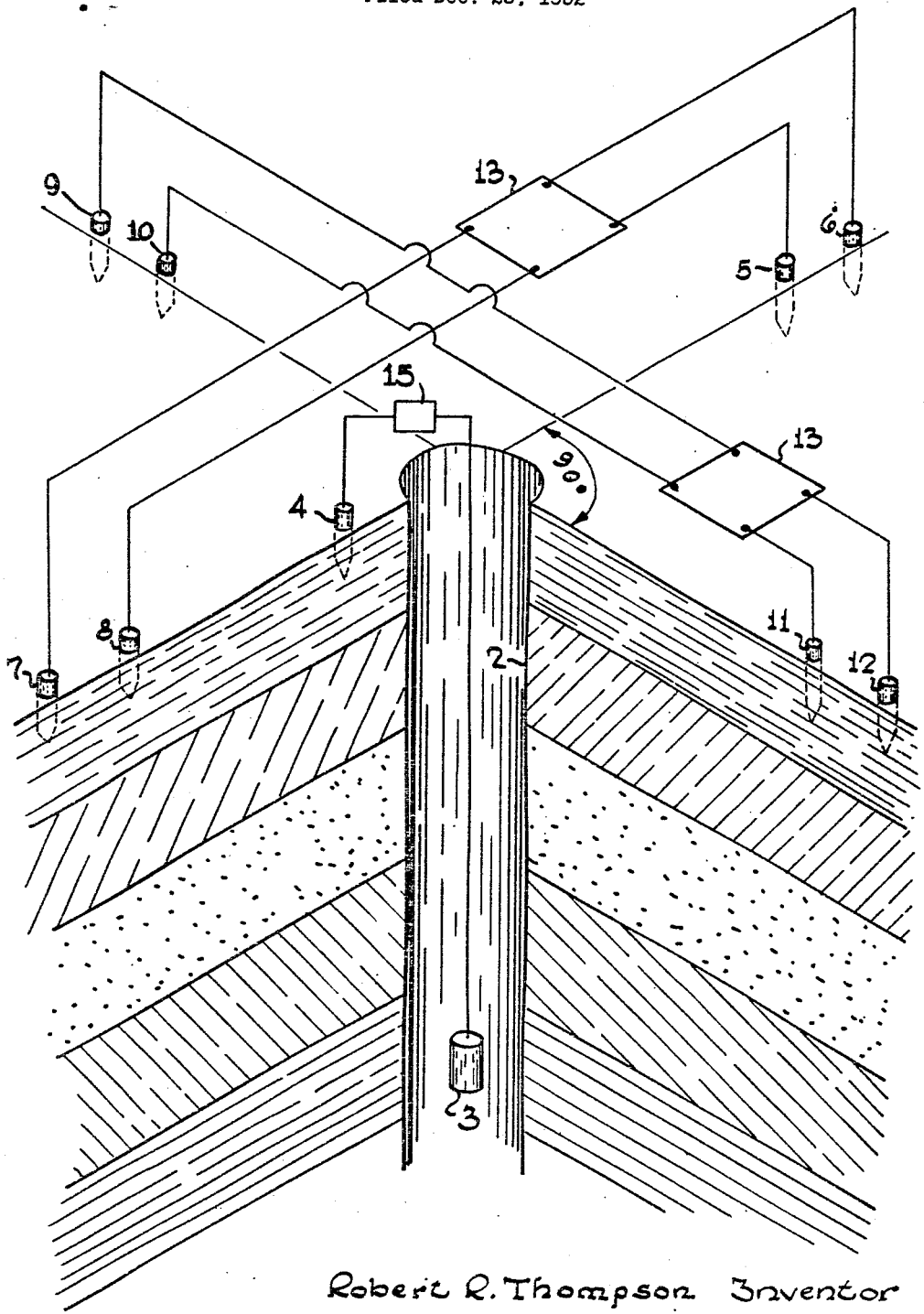
Robert R. Thompson Inventor
By W. O. Heilman Attorney

United States Patent Office 2,708,261
Patented May 10, 1955

2,708,261
SUBSURFACE AREAL ELECTRICAL EXPLORATION

Robert R. Thompson, Tulsa, Okla., assignor to Esso Research and Engineering Company, a corporation of Delaware Application December 23, 1952, Serial No. 327,634

5 Claims. (Cl. 324—1)

This invention concerns a technique of electrical exploration for determining resistivity anomalies in subsurface areas of the earth. The invention particularly relates to an electrode arrangement making possible expeditious prospecting for resistivity anomalies over extensive lateral areas and at considerable depths.

The present invention relates to the techniques called "electrical well logging." In electrical well logging, a variety of electrode arrengements are employed in a bore hole so as to determine variations in electrical values along the length of a bore hole. Presently known electrical well logging methods serve to provide valuable information as to the nature of the earth in the immediate vicinity of a bore hole. It is a general object of this invention to modify and extend the principles of electrical well logging to make possible an electrical prospecting method providing information concerning deep underground formations laterally spaced from the bore hole. For this purpose, it is necessary to eliminate effects caused by resistivity anomalies close to the surface of the earth and close to the bore hole used in conventional electrical prospecting methods.

The value of developing an electrical exploration method for achieving these general objectives has been appreciated. Various suggestions have been made as to electrical prospecting methods and electrode arrangements for subsurface areal prospecting. It is therefore a more specific object of this invention to overcome certain inherent disadvantages of the suggestions which have been made. In particular, it is intended to provide a prospecting method which minimizes the time, expense and effort required to obtain significant results. From this viewpoint, the present invention provides a simple and effective technique of electrical prospecting, providing data as to resistivity anomalies in an expeditious manner.

In accordance with this invention, an electrode arrangement is employed in which a pair of current electrodes are employed to pass current from a bore hole into the earth about the bore hole. Both of the current transmitting electrodes may be positioned in the bore hole if desired, and one or both of the electrodes is moved down the bore hole during prospecting in order to detect variations in the earth's resistivity at different levels. A pair of potential electrodes on the surface of the earth, spaced some few hundred feet apart, are aligned with a similar pair on the opposite side of the bore hole and each pair is remotely spaced from the bore hole. Thus, the two pairs of potential electrodes employed may be spaced several thousand feet from the bore hole. This electrode arrangement results in the imposition of an electrical field in the earth between the two current electrodes which includes substantial lateral distances from the bore hole. Dependent on the removal of the potential electrodes referred to from the bore hole the detected electrical potentials will be a function of the flow of current through the earth at substantial distances from the bore hole. By effectively rotating the two pairs of potential electrodes about the bore hole while the current electrodes are maintained at a given level in the bore hole, any axial asymmetry in the earth's conductor field can be detected by comparing the voltages detected by the opposed pairs of potential electrodes.

The nature of the invention will be further appreciated by reference to the drawing in which the single figure diagrammatically illustrates an electrode arrangement for practicing this invention.

In order to obtain complete information as to the location of resistivity anomalies in the earth, it is preferred to arrange four pairs of potential electrodes on orthogonal radii from the bore hole. In many cases it may be desirable to employ additional potential electrodes arranged on a greater number of radial lines. Employing four pairs of electrodes provides a pattern of two sets of electrodes, each set comprising two pairs of electrodes arranged on opposite sides of the bore hole, with the two sets being arranged along lines normal to each other. Any resistivity anomaly in the earth within the range of the electrical field including the current electrodes and the potential electrodes will create a voltage differential between each of the opposed pairs of electrodes. The azimuthal orientation of the detected anomaly can be determined from the magnitude of the voltage differential of the two sets of electrodes. The depth of the resistivity anomaly can be approximated from the variation in detected voltage differentials as the depth of the current electrodes is varied.

As regards the arrangement of the current electrodes to be employed, it is generally preferred to position one of the current electrodes at the surface of the earth adjacent the bore hole. In this case, it is only necessary to lower the other current electrode to different levels in the bore hole while making potential determinations at the different pairs of potential electrodes. When this arrangement of current electrodes is used, the current electrode at the surface of the earth is preferably spaced from the bore hole at a distance of about 100 feet. This serves to prevent the current electrode arrangement from directly energizing the drilling rig, feeder pipe lines, and surface casing of the bore hole. While this is the preferred arrangement, this invention is also operable when both current electrodes are positioned in the bore hole itself. When this is carried out, one of the current electrodes may be held at a fixed depth in the bore hole while the other current electrode is passed along the bore hole during prospecting. Alternatively, both of the current electrodes may be passed along the bore hole at a fixed spacing from each other. When this is done, it is important that the spacing between the current electrodes be substantial. A spacing of at least several hundred feet is required.

It is apparent that in the electrical prospecting method described, the necessary physical operations required during prospecting are minimized. It is not ordinarily required to alter the position of the potential electrodes once a desired configuration is arranged. Thus, for example, if four pairs of potential electrodes are employed, these may be fixed in suitable position and there maintained during the entire prospecting. By positioning the current electrodes at the bore hole as described while positioning the potential electrodes on the ground along bore hole radii another important advantage is achieved. Each of the two pairs of potential electrodes may simultaneously be operated without necessity for resorting to any sequential operational technique. This feature makes possible a complete earth exploration by simply recording the detected potentials of the pairs of potential electrodes employed, while sequentially or continuously lowering one or both of the current electrodes down the bore hole. Thus, it is not necessary to first prospect along one bore hole radius establishing a first profile of exploration through the earth and then repeating this exploration for the other required base line radii. It is apparent therefore, that the electrode arrangement generally indicated is effective in simplifying the time and effort required in determining lateral prospecting information.

The extent of lateral penetration of this prospecting technique from the bore hole is related to a number of factors. First, as indicated, the lateral area embraced depends upon the distance at which the potential electrodes are removed from the bore hole. It is apparent that the areal spread may be increased by removing the potential electrodes to greater distances from the bore hole. In the practice of this invention however, it is generally preferred to position the potential electrodes at a distance of about one-half to one mile from the bore hole. Removal of the potential electrodes from the bore hole by this distance permits this prospecting method to embrace a very extensive area within the earth. Dependent on the depth of the current electrodes, at depths of one mile or greater, the potential electrodes are in a path of current extending up to about a mile laterally from the bore hole.

Particular provisions are required in this prospecting method to supply the current electrodes with a suitable form of electrical energy. In the environment in which the electrodes are employed, it is practically impossible to obtain the prospecting information desired by using alternating current. Even with low frequency A. C. current, "skin effects" result which cause the current to concentrate along the surface of the earth and/or the bore hole, obviating the purposes of this invention. By use of extremely low frequency A. C. current the detrimental skin effects may in part be avoided. Thus, it is frequently possible to secure useful prospecting information if a frequency of less than 10 cycles per second is employed. However, in the preferred practice of this invention, commutated D. C. current is supplied to the current electrodes. As this term is used, the polarity of the D. C. source applied to the current electrodes and the polarity of the recording circuits associated with the potential electrodes are both periodically reversed. Preferably a commutation frequency of about one reversal per second is employed. Use of commutated D. C. current of this character serves to avoid skin effects caused by A. C. current and furthermore aids in elimination of natural earth potentials from the detected signals. In this connection, as is well known, there are natural earth currents of sufficient magnitude to obscure potential readings unless particular provisions are made. By using commutated D. C. current the variation of detected signal at the potential electrodes above a base line value serves to completely eliminate the effect of detected natural earth potentials. The magnitude of the energizing current should be as large as feasible. In practice it has been found that currents of 5 to 10 amperes are satisfactory.

With this general background as to the nature of this invention, the accompanying drawing may be understood. The drawing diagrammatically illustrates a section of the earth penetrated by a bore hole within and about which is positioned the novel electrode arrangement of this invention. A bore hole is designated by the numeral 2. It will be understood that this bore hole may be of any depth and that the technique of this invention may be employed in the deepest bore hole. Suspended within the bore hole is a first current electrode 3 of conventional character to transmit an electrical signal into the earth adjacent the bore hole. A supporting cable including an electrical conductor connected to the electrode serves to support the electrode in the bore hole. While not illustrated in the drawing a measuring sheave or the like is employed at the surface of the earth to determine the depth of the electrode 3 in the bore hole 2. The down-the-hole current electrode 3 is preferably operated in conjunction with a second current electrode 4 imbedded in the earth adjacent the mouth of the bore hole. Improved results are obtained by spacing the surface electrode 4 at a distance of about 100 feet from the mouth of the bore hole. A suitable source of electrical current 15 is electrically connected to electrodes 3 and 4 so that a current is passed through the body of the earth generally interposed between the two electrodes. Electrical source 15 preferably constitutes a source of D. C. current such as a battery operatively connected to a commutation means to periodically reverse the polarity of the two electrodes.

In the arrangement illustrated, four pairs of potential electrodes are diagrammatically illustrated which are positioned on four radial lines extending from the bore hole at an angle of 90 degrees from each other. These electrodes are designated as electrodes 5 and 6, making up one pair, electrodes 7 and 8, making up an opposed pair; electrodes 9 and 10, constituting a third pair, and electrodes 11 and 12, constituting a fourth pair opposite the third pair. Electrodes of each pair are arranged so as to be co-linear with the bore hole and are spaced from each other by a substantial distance of at least several hundred feet. The distance between each of the electrodes making up the individual pairs should be the same in each case. Again, it is generally preferred that each pair of electrodes be spaced the same distance from the bore hole in the general range of about one-half to one mile. Thus the corresponding electrodes of the several pairs will be substantially equidistant from the bore hole, that is to say electrodes 10, 5, 11, and 8 will be substantially equidistant from the bore hole and electrodes 9, 6, 12, and 7 will be substantially equidistant from the bore hole. Each of the potential electrodes may be of conventional character of the type to be embedded in the surface of the earth or buried somewhat beneath so as to secure good ground contact. Differential voltage recording means 13 are connected between the opposed pairs of electrodes. Voltage recording means 13 serves to compare the voltage picked up by each pair of opposed electrodes. For example, if a greater voltage is detected between electrodes 7 and 8 than that between electrodes 5 and 6, this indicates that a resistivity anomaly occurs in the earth on the side of the bore hole at which electrodes 5 and 6 are positioned. By then noting if this resistivity anomaly affects the detected voltage of electrodes 11 and 12 more than that of electrodes 9 and 10, the general orientation of this anomaly can be determined. For this purpose voltage recording means 13, if desired, may exhibit the ratio, rather than the difference, between the voltages of opposed pairs of electrodes.

In practice, the simplest form of voltage recording means 13 is a conventional recording D. C. volt meter together with a suitable detecting circuit. The detected voltage of the two pairs of electrodes can be supplied in opposition to the volt meter so that it will directly indicate the differential detected voltage. The recording means in addition includes a commutation switch so as to reverse the polarity of the paired potential electrodes at the same frequency at which the polarity of current supplied to the current electrodes is changed.

By the periodic reversal of the polarity of current supplied to the current electrodes and the simultaneous reversal of the recording circuit of the potential electrodes, D. C. pulses will be detected and recorded, by the potential electrodes. These pulses will extend above a background level, primarily established by the existent natural earth potential. A bias voltage may be used at each recorder to change the recording base value so as to eliminate any effect of detected natural earth potentials. It is a particular feature of the electrode arrangement of this invention that "noise" produced by fluctuation of natural earth currents is minimized. This occurs since the fluctuation noise picked up by the two pairs of potential electrodes will be substantially equal. Since the voltage difference between the pairs of electrodes is determined, this noise is effectively cancelled. In prospecting with the arrangement described, a desired number of potential electrode pairs are arranged on the surface of the earth about the bore hole. In the particular arrangement described, the down-the-hole current electrode 3 is then lowered into the bore hole while continuously recording the differential detected voltage between each of the opposed pairs of potential electrodes. By this means a continuous plot of voltage variation with depth is obtained for each of the double pairs of potential electrodes. The information obtained may be employed in a variety of ways. For example, vector diagrams may be prepared at different levels in the bore hole showing the apparent restivity detected by the pairs of potential electrodes for that level in the bore hole. The differences in the vectorial values of apparent resistivity will then indicate the azimuthal position of the conductivity anomalies and will also indicate the relative magnitude thereof.

It is apparent from what has been said that the prospecting method described provides valuable information for many purposes. By correlating the electrical prospecting information obtained, with information as to the geological structure of the earth, it becomes possible to reasonably predict the location of suitable drilling sites in many cases. Valuable dip information can be obtained indicating at least the approximate position of strata about the bore hole. It will be apparent to those skilled in the art that the prospecting method described may be used for these and other purposes.

In refining the prospecting method described it is frequently desirable to account for any deviation of the bore hole from the vertical. Suitable corrections of the detected potential signals may be made in conjunction with a bore hole deviation log so as to eliminate any effect caused by inclination of the bore hole. Again, it is possible and desirable to correct the recorded potential signals in accordance with any differences in elevation of the potential electrode stations.

What is claimed is:

1. An electrode arrangement for subsurface areal prospecting comprising, in combination, a pair of current electrodes placed in conductive relation to the earth and positioned at a bore hole penetrating the earth, said current electrodes being separated a substantial distance apart and at least one of said electrodes being positioned within the bore hole, a source of electrical current connected to said pair of current electrodes, at least four pairs of potential electrodes contacting the earth, said pairs being distributed uniformly about the bore hole along orthogonal lines so that the electrodes of each pair are substantially co-linear both with the bore hole and with the electrodes of another pair on the opposite side of the bore hole, the corresponding electrodes of the several pairs being positioned substantially equidistant from the bore hole, and voltage detecting means connected to opposed pairs of electrodes to compare the voltage outputs of said opposed pairs.

2. The arrangement defined by claim 1 in which one of said current electrodes is in contact with the earth adjacent the mouth of the bore hole but spaced therefrom at a distance of about 100 feet.

3. The arrangement defined by claim 1 in which the two electrodes in each of the said pairs of potential electrodes are spaced apart by a distance of at least several hundred feet.

4. The arrangement defined by claim 1 in which each of the said pairs of potential electrodes is spaced from the bore hole by a distance of about one-half to one mile.

5. A method of electrical prospecting in which an electrical current is introduced into the earth through a pair of current transmitting electrodes spaced a substantial distance apart and placed in conductive relation to the earth, at least one of said electrodes being placed within a bore hole and moved to different depths within the bore hole, and in which resulting potential variations in the earth are detected by pairs of potential electrodes arranged on orthogonal radial lines extending from the bore hole in a manner aligning each pair of electrodes with the bore hole and with another pair beyond the bore hole, the innermost electrodes of the several pairs being substantially equidistant from the bore hole and the outermost electrodes of the several pairs being substantially equidistant from the bore hole, including the step of comparing the potential detected by a pair of electrodes on one side of the bore hole with the potential detected by the pair of electrodes on the diammetrically opposite side of the bore hole.

References Cited in the file of this patent

UNITED STATES PATENTS

| Number | Name | Date |
|---|---|---|
| 1,842,361 | Nichols | Jan. 19, 1932 |
| 2,133,786 | Neufield | Oct. 18, 1938 |
| 2,179,593 | Jakasky | Nov. 14, 1939 |
| 2,263,097 | Marchand | Nov. 18, 1941 |
| 2,288,973 | Neufeld | July 7, 1942 |
| 2,294,395 | Evjen | Sept. 1, 1942 |
| 2,345,608 | Lee | Apr. 4, 1944 |
| 2,440,693 | Lee | May 4, 1948 |
| 2,575,349 | Lee | Nov. 20, 1951 |
| 2,619,520 | Nichols | Nov. 25, 1952 |
| 2,622,124 | Homer | Dec. 16, 1952 |